(12) United States Patent
Burgman et al.

(10) Patent No.: US 8,251,862 B2
(45) Date of Patent: Aug. 28, 2012

(54) PLANETARY CARRIER PINION PIN RETAINER PLATE

(75) Inventors: Boris Burgman, Oak Park, MI (US); John A. Diemer, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 12/715,296

(22) Filed: Mar. 1, 2010

(65) Prior Publication Data
US 2010/0151986 A1 Jun. 17, 2010

(51) Int. Cl.
F16H 57/08 (2006.01)
(52) U.S. Cl. ........................................ 475/348
(58) Field of Classification Search .................. None
See application file for complete search history.

(56) References Cited

U.S. PATENT DOCUMENTS

| | | | | |
|---|---|---|---|---|
| 2,959,073 A * | 11/1960 | Doerfer et al. | ................. | 475/348 |
| 4,756,212 A * | 7/1988 | Fuehrer | ........................... | 475/159 |
| 4,901,601 A * | 2/1990 | Leggat | ............................ | 475/348 |
| 4,998,909 A * | 3/1991 | Fuehrer | ........................... | 475/331 |
| 6,023,836 A * | 2/2000 | Matsuoka et al. | ............... | 29/557 |
| 6,918,853 B2 * | 7/2005 | Tanikawa | ........................ | 475/348 |
| 7,081,067 B2 * | 7/2006 | Tanikawa et al. | ............... | 475/331 |
| 7,686,727 B2 * | 3/2010 | Hammill | .......................... | 475/159 |
| 2009/0042687 A1 * | 2/2009 | Ziemer et al. | ................... | 475/331 |
| 2009/0253545 A1 * | 10/2009 | Diosi et al. | ...................... | 475/159 |

* cited by examiner

Primary Examiner — Dirk Wright

(57) ABSTRACT

A shaft retainer for a planet gear carrier of a planetary gear assembly both retains the pinion shafts within the carrier and maintains their angular orientation to achieve improved oil flow to the pinion bearings. Each of the pinion shafts includes an opening and an axial passageway that communicates with a radial passageway at the middle of the shaft. At the end of the pinion shaft opposite the axial passageway opening is a flat extending across the shaft. The flat is normal to the axis of the radial passageway. The pinion shafts are slip fit into suitable bores in the planetary gear carrier and support a needle bearing and planet or pinion gear. At one end of the carrier, the flats are engaged by a circular retainer so that the radial passageways of each of the pinion shafts are oriented radially outwardly. The circular retainer may either be a flat circular plate or have an L-shaped cross-section. The circular retainer may be affixed to the planetary gear carrier by a snap ring or a plurality of fasteners. At the end of the carrier having the axial shaft passageway openings, a lube dam directs a flow of lubricating oil from a source such as a hollow drive shaft to the open axial ends of the pinion shafts.

20 Claims, 3 Drawing Sheets

PLANETARY CARRIER PINION PIN RETAINER PLATE

FIELD

The present disclosure relates to a planetary gear carrier of a planetary gear assembly and more particularly to a pinion pin retainer for a planetary gear carrier of a planetary gear assembly.

BACKGROUND

The statements in this section merely provide background information related to the present disclosure and may or may not constitute prior art.

Planetary gear assemblies are remarkably versatile and adaptable devices. Various motor vehicle driveline components such as transmissions, differentials and transaxles make frequent and common use of planetary gear assemblies. Typically they are utilized either singly to provide a speed reduction and torque increase or arranged in tandem and associated with clutches and brakes that interconnect or ground various elements of the planetary gear assemblies to provide multiple speed reductions and torque multiplications.

A simple planetary gear assembly comprises a centrally disposed sun gear, a planet gear carrier disposed generally about the sun gear and a ring gear disposed about the carrier. A plurality of planet gears rotatably mounted on shafts in the carrier engage both the sun and the ring gears.

There are, of course, many engineering issues regarding the design and manufacture of planetary gear assemblies. One involves the manner by which the planet gear shafts are retained or secured to and within the planet gear carrier. One approach is to provide small bores through the shaft and carrier that may be aligned and through which a retaining pin may be inserted. Another approach involves deforming by, for example, staking, the pinion shaft to the carrier. Both of these approaches require suitable shaft adjacent regions of the carrier which may either receive the pin or the deformed region of the shaft and thus may not be suitable in many instances.

Another engineering issue relates to lubrication. In certain configurations and in certain vehicle speed ranges, the rotational speed of the planet or pinion gears of a given planetary gear assembly may be quite significant, i.e., many thousand r.p.m. The rotational speed of the planet gear carrier may also be quite high. High planet or pinion gear speeds are not problematic per se but they do require sufficient lubrication not only to lubricate the pinion-bearing-pinion shaft interface but also to carry off heat generated by such high speed rotation at the interface.

The present invention is directed to providing an improved retainer which not only retains pinion shafts in a planet gear carrier but also maintains their angular orientation which provides improved bearing lubrication.

SUMMARY

The present invention provides a pinion shaft retainer for a planet gear carrier of a planetary gear assembly which both retains the pinion shaft within the carrier and maintains their angular positions to achieve improved oil flow to the pinion bearings. Each of the pinion shafts includes an axial passageway that communicates with a radial passageway proximate the midpoint of the shaft. At the end of the pinion shaft opposite the axial passageway opening is a flat extending across the shaft. The flat is normal to the axis of the radial passageway. The pinions shafts are slip fit into suitable bores in the planetary gear carrier and support a caged roller or needle bearing and planet or pinion gear.

At one end of the carrier, the flats are engaged by a circular retainer so that the radial passageways of each of the pinion shafts are oriented radially outwardly. The circular retainer may either be a flat plate or have an L-shaped cross-section. The circular retainer may be secured to the planetary gear carrier by a snap ring or a plurality of fasteners such as bolts or machine screws. At the opposite end of the carrier, a lube dam is secured to the planetary gear carrier and directs a flow of lubricating oil from a source such as a hollow drive shaft to the open ends of the axial passageways of the pinion shafts. By maintaining the outward radial orientations of the radial pinion shaft passageways, the flow of lubricating oil to the pinion shaft-bearing-pinion interfaces is essentially unaffected by the rotational speed of the planetary gear carrier.

Thus it is an aspect of the present to provide a planetary gear carrier having improved pinion shaft-bearing-pinion lubrication for a planetary gear assembly.

It is a further aspect of the present invention to provide a pinion shaft for a planetary gear carrier of a planetary gear assembly having an axial passageway that extends from one end to a radial passageway proximate the midpoint of the shaft.

It is a still further aspect of the present invention to provide a planetary gear carrier having a circular retainer which retains a plurality of pinion shafts in a desired rotational orientation.

It is a still further aspect of the present invention to provide a planetary gear carrier having a circular retainer which retains a plurality of pinion shafts having a radial lubrication opening in a desired rotational orientation.

It is a still further aspect of the present invention to provide a planetary gear carrier having a circular retainer defining either a flat plate or an L-shape which retains a plurality of pinion shafts in a desired rotational orientation.

It is a still further aspect of the present invention to provide a planetary gear carrier having a circular retainer which engages flats on the ends of a plurality of pinion shafts to retain them in a desired rotational orientation.

It is a still further aspect of the present invention to provide a planetary gear carrier having a circular retainer which engages flats on the ends of a plurality of pinion shafts which include radial lubrication passageways to retain the radial passageways in a radial outward orientation.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
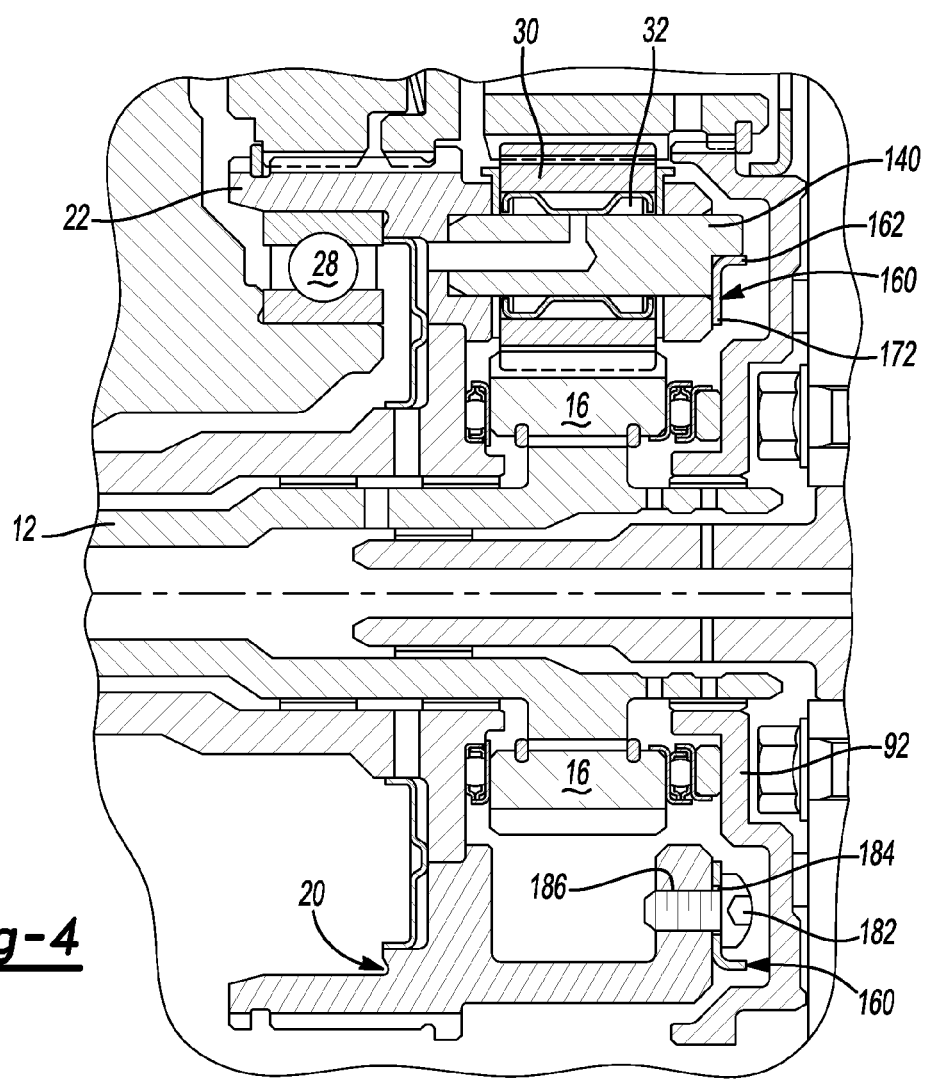
Figure 3:
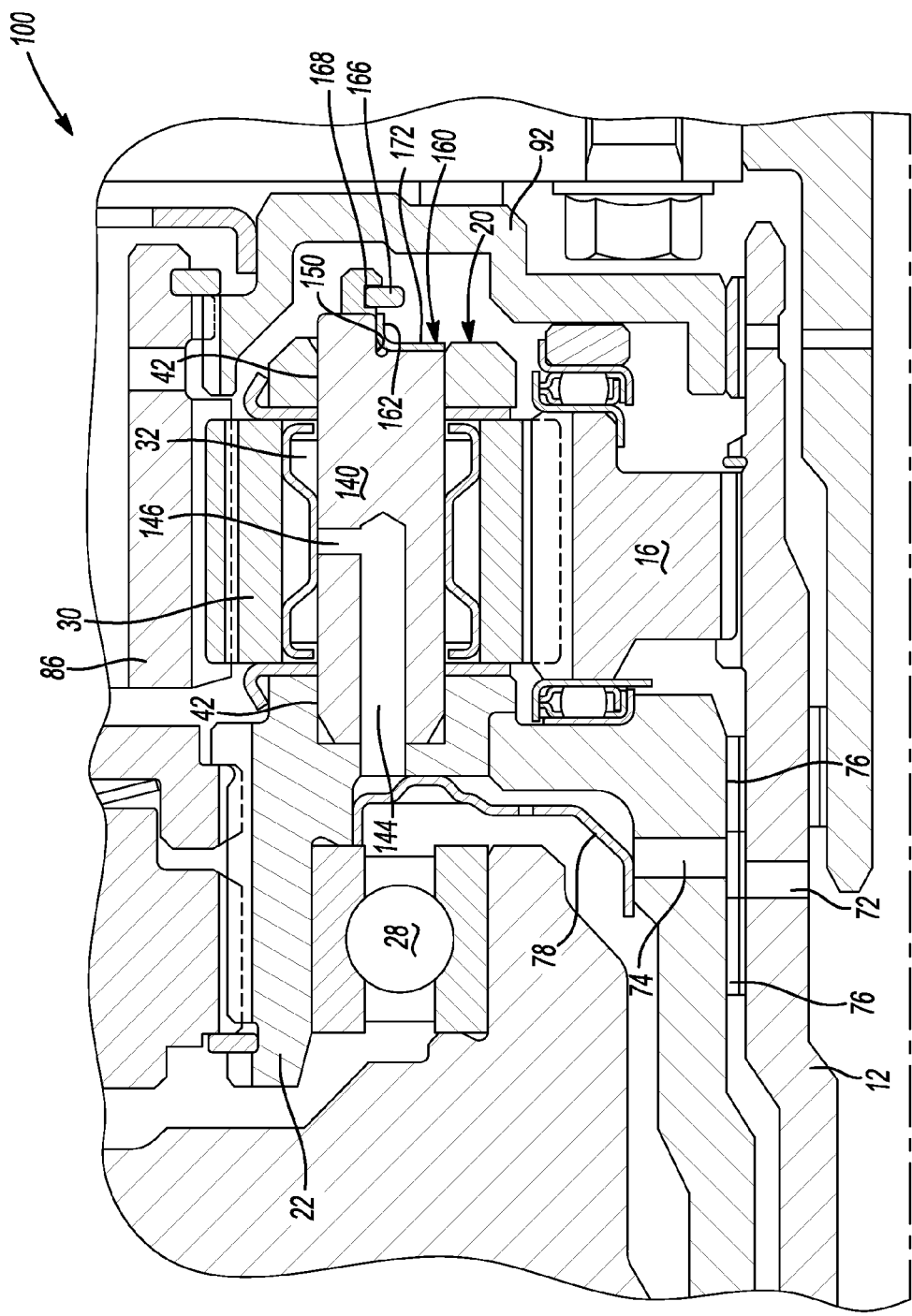

FIG. 3 is a fragmentary, sectional view of a portion of a planetary gear assembly including a pinion shaft and circular L-shaped retainer ring according to a second embodiment of the present invention; and FIG. 4 is a fragmentary, sectional view of a portion of a planetary gear assembly including a pinion shaft and circular L-shaped retainer ring according to the second embodiment of the present invention secured by machine bolts or screws to the planet gear carrier.

DETAILED DESCRIPTION

The following description is merely exemplary in nature and is not intended to limit the present disclosure, application, or uses in any way.

Figure 1:
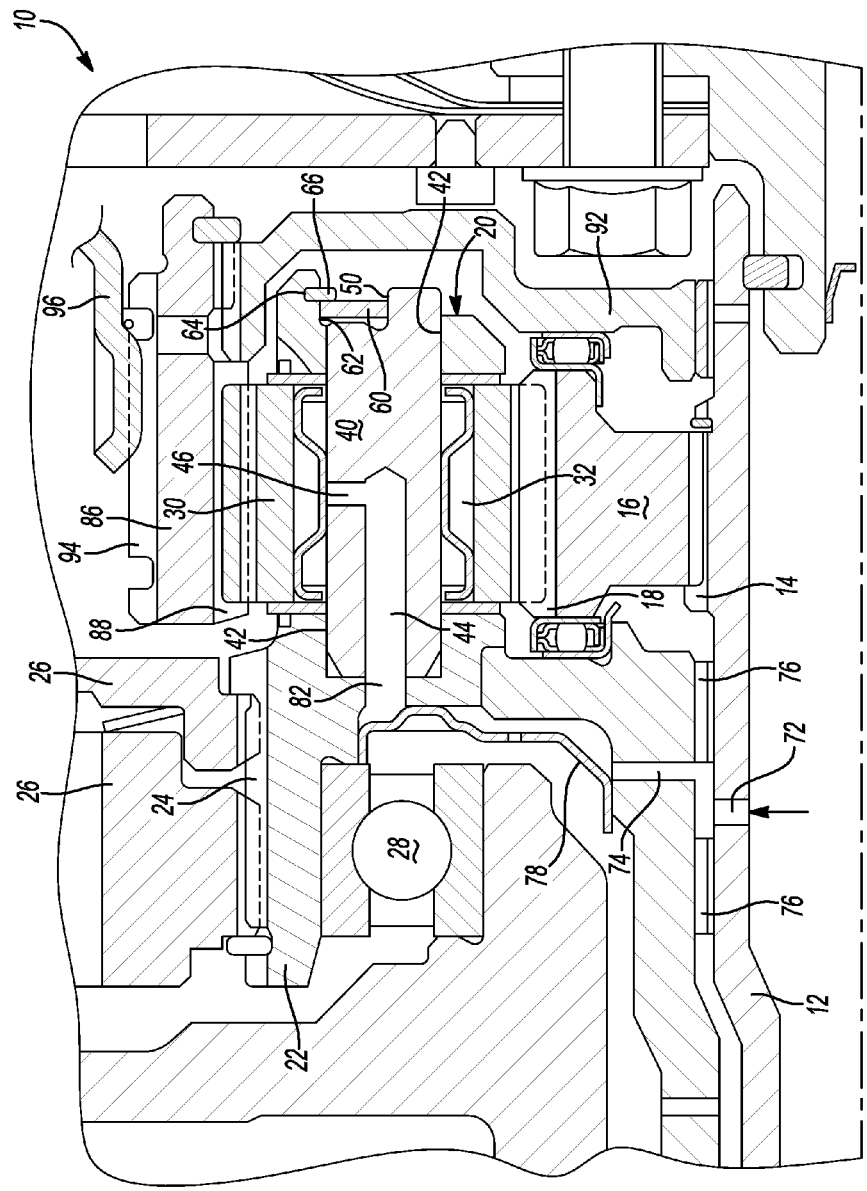
FIG. 1 is a fragmentary, sectional view of a portion of a planetary gear assembly including a pinion shaft and circular flat retainer according to a first embodiment of the present invention secured by a snap ring to the planet gear carrier.

With reference to FIG. 1, a first embodiment of the present invention is illustrated in conjunction with a portion of a planetary gear assembly which is designated by the reference number 10. The planetary gear assembly 10 includes a hollow drive or input shaft 12 having external or male splines 14 which couple and drive a sun gear 16 having gear teeth 18 and a planet gear carrier 20. The planet gear carrier 20 is preferably a weldment comprising forged or cold formed components and which is generally aligned with the sun gear 16. The planet gear carrier 20 includes an annular extension 22 having male splines or gear teeth 24 which are engaged by associated drive or driven members 26. The planet gear carrier 20, and specifically the annular extension 22, is freely rotatably supported by a ball bearing assembly 28.

The planet gear carrier 20 also includes a plurality of planet or pinion gears 30 that are received upon anti-friction bearings, such as caged roller or needle bearing assemblies 32. The roller or needle bearing assemblies 32, in turn, are received upon a respective plurality of stub or pinion shafts 40 which are received within a plurality of pairs of spaced-apart, aligned bores 42 in the planet gear carrier 20. The number of planet or pinion gears 30, bearing assemblies 32, stub or pinion shafts 40 and pairs of aligned bores 42 may be three, four, five, six or more depending upon the torque load of the planetary gear assembly 10 and other design parameters. The pluralities of pairs of aligned bores 42, the stub or pinion shafts 40, the bearing assemblies 32 and the planet or pinion gears 30 are typically and preferably arranged or disposed parallel to and at equal angular intervals about the common axis of the input shaft 12 and the planet gear carrier 20. For example, if there are six of each of the aforementioned components, they will preferably be spaced at 60° intervals about the common axis of the input shaft 12 and the planet gear carrier 20.

Figure 2:
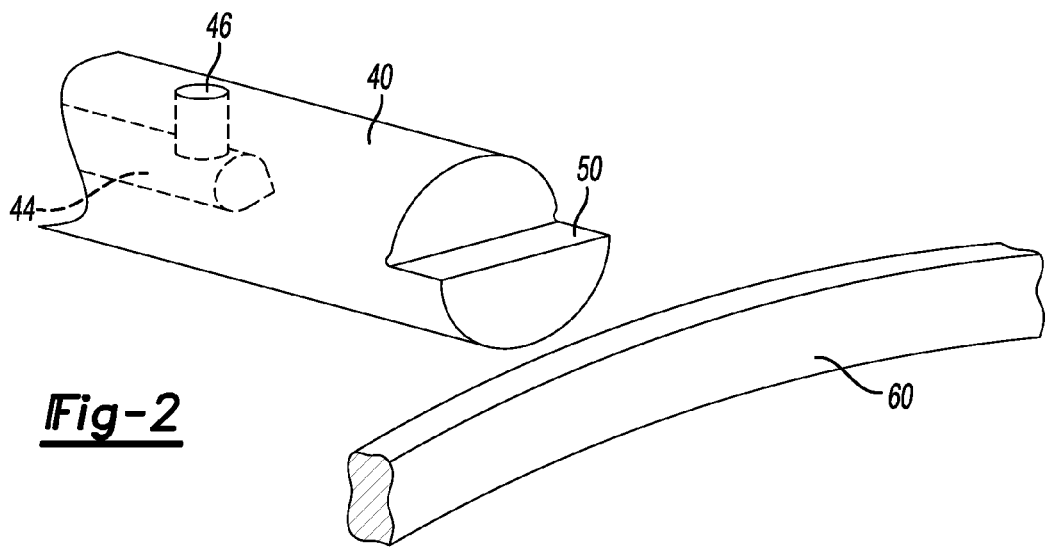
FIG. 2 is a fragmentary, enlarged, perspective view of a portion of a pinion shaft and circular retainer plate according to the first embodiment of the present invention.

As illustrated in FIGS. 1 and 2, the stub or pinion shafts 40 each include a concentric, axial bore or passageway 44 that opens at one end of the shaft 40 and extends along the axis of the shaft 40 to about its midpoint. Intersecting the axial passageway 44 near or at the axial midpoint of the pinion shaft 40 is a radial bore or passageway 46 preferably having the same diameter as the axial passageway 44. The intersecting axial and radial passageways 44 and 46 thus provide fluid communication between one end of the stub or pinion shaft 40 and a point on its outer surface at or near its axial midpoint.

At the end of each of the stub or pinion shafts 40 opposite the opening of the axial bore or passageway 44 is a diametral surface 50, that is, a flat surface which is preferably coincident with or passes through the center of the shaft 40. It should be understood, however, that the diametral surface 50 need not be coincident with a diameter but may be chordal surface of slightly shorter length, on either side of the diameter. Furthermore, the diametral surface 50 may be slightly curved or convex, if desired. Though axially spaced from the radial passageway 46, the diametral surface 50 is perpendicular to the axis of the radial passageway 46. In the first embodiment, the diametral surface 50 faces radially outward. Thus, when the surface 50 is maintained in a radially outwardly facing orientation, the radial passageway 46 is also oriented radially outward.

The diametral surfaces 50 of the stub or pinion shafts 40 and thus the radial passageways 46 are maintained in a radially outwardly facing orientation by a circular retainer plate 60. The circular retainer plate 60 is disposed between the surfaces 50 of each of the pinion shafts 40 and a shallow groove or shoulder 62 extending around the planet gear carrier 20. An adjacent channel 64 receives a snap ring 66 which retains the circular retainer plate 60 in the planet gear carrier 20.

As noted above, the input shaft 12 is hollow and is pressurized with lubricating oil or hydraulic fluid. A radial port 72 in the wall of the input shaft 12 directs pressurized fluid into a radial passageway 74. A pair of rotating seals 76 maintain a fluid tight seal between the input shaft 12 and components within the planetary gear assembly 10. A lube dam 78 directs lubricating fluid radially outwardly to a plurality of axial ports 82 which align with the bores 42 in the planet gear carrier 20 and the axial passageways 44 in the stub or pinion shafts 40. Thus, lubrication is provided directly to the pinion/bearing/shaft interface. Moreover, the radial passageway 46 that provides such lubrication is maintained in a radially outward orientation which minimizes the effect of high speed rotation of the planet gear carrier 20 on lubrication flow.

The planetary gear assembly 10 also includes a ring gear 86 having gear teeth 88 that are engaged by the planet or pinion gears 30. The ring gear 86 may be supported by a hub or collar 92 that is piloted on the input shaft 12. External gear teeth or splines 94 on the ring gear 86 are engaged by associated components 96 of the planetary gear assembly 10.

Referring now to FIG. 3, a second embodiment pinion pin retainer is illustrated and designated by the reference number 100. Typically, the second embodiment pin retainer 100 may be and is utilized with a planetary gear assembly 10' that is substantially identical to the planetary gear assembly 10 described above. Thus, the planetary gear assembly 10' includes the hollow drive or input shaft 12, the sun gear 16, a planet gear carrier 20', the annular extension 22, the ball bearing assembly 28, the planet or pinion gears 30, the caged roller or needle bearings 32, the pairs of aligned bores 42, the ring gear 86 and the hub or collar 92 as well as the other associated elements described above and other components specifically described below which are distinct from the first embodiment.

The second embodiment pinion pin retainer 100 includes a plurality of stub or pinion shafts 140. As noted above, there may be three, four, five, six or more stub or pinion shafts 140 (and the associated pinion gears 30 and the bearings 32) depending upon the torque load and other design parameters of the particular assembly 10'. Each of the stub or pinion shafts 140 include a concentric, axial passageway 144 that extends from one end of the shaft 140 to approximately its axial midpoint. Intersecting the axial passageway 144 at approximately the midpoint of the shaft 140, is a radial passageway that is preferably the same diameter as the axial passageway 144. At the end of the shaft 140 opposite the axial passageway 144 is a diametral surface 150. Once again, although the surface 150 is preferably a plane of diameter, it may be a chordal surface of shorter length on either side of a diameter. In the second embodiment 100, the surface 150 may also be slightly curved or concave. Furthermore, in the second embodiment 100, the diametral surface 150 faces radially inwardly. That is, relative to the first embodiment and the shafts 40 in which the radial passageways 46 and the surfaces 50 all are directed or face radially outwardly, the radial passageways 146 and the surfaces 150 of the shafts 140 of the second embodiment 100 face in opposite radial directions.

Engaging the diametral surfaces 150 of the stub or pinion shafts 140 and inhibiting rotation thereof is an L-shaped retainer ring 160. The L-shaped retainer ring 160 includes a first, axially extending leg or section 162 which abuts or engages a snap ring 166 which seats or is received within a groove or channel 168 in the planet gear carrier 20'. The snap ring 166 maintains the L-shaped retainer ring 160 in position against the stub or pinion shafts 140. The L-shaped retainer ring 160 also includes a second, radially extending leg or section 172 which engages both the shafts 140 and the planet gear carrier 20'.

The second embodiment 100 also includes the radial port 72 in the input or drive shaft 12, the passageway 74, the pair of axially spaced-apart rotating seals 76 and the lube dam 78. Thus, pressurized oil or other lubricating fluid is provided through the radial port 72, between the seals 76, along the lube dam 78, into the axial passageways 144 and through the radial passageways 146 which are always oriented radially outwardly.

It should perhaps be clarified and certainly appreciated that while the circular retainer plate 60 and the L-shaped retainer ring 160 are referred to throughout this text as a "retainer," they both not only retain the stub or pinion shafts 40 and 140 within the planet gear carriers 20 and 20' but also specifically maintain the radially outward alignment of the radial passageways 46 and 146 relative to the axes of the planet gear carriers 20 and 20', as described above.

Referring now to FIGS. 3 and 4, an alternate mounting means for either the circular retainer plate 60 or the L-shaped retainer ring 160 is illustrated. In this mounting configuration, the snap rings 66 and 166, as well as the channels 64 and 168 in the planet gear carriers 20 and 20', respectively, are eliminated. In their place are a plurality of threaded fasteners such as machine bolts or cap screws 182 which pass through a like plurality of openings 184 in the circular retainer plate 60 or the L-shaped retainer ring 160 (illustrated) and into complementarily threaded openings 186 in the planet gear carrier 20 or 20' (illustrated). The plurality of threaded fasteners 182, the openings 184 and the threaded openings 186 are preferably disposed in equal angular intervals about the axis of the planet gear carrier 20'. The circular retainer plate 60 or the L-shaped retainer ring 160 are thus secured to the planet gear carrier 20 or 20' by a plurality of removable threaded fasteners 182 but function the same as described above to both retain the stub or pinion shafts 40 and 140 within the planet carriers 20 and 20' and maintain the radially outward orientation of the radial passageways 46 and 146.

The foregoing description of the invention is merely exemplary in nature and variations that do not depart from the gist of the invention are and are intended to be within the scope of the invention. Such variations are not to be regarded as a departure from the spirit and scope of the invention and the following claims.

What is claimed is:

1. A planetary gear carrier assembly comprising, in combination,
   a planetary gear carrier defining an axis and having a plurality of pairs of aligned, spaced-apart bores, a pinion receiving region between a pair of spaced-apart bores,
   a pinion disposed in each pinion receiving region,
   an anti-friction bearing disposed in each pinion,
   a stub shaft disposed within said anti-friction bearing and received within one of said pairs of aligned bores, said stub shaft including a planar end and a non-planar end opposite the planar end and an axial bore opening in said planar end communicating with a radial bore and a flat at said non-planar end, said radial bore oriented perpendicularly to said flat, and
   means for engaging said flat of said stub shaft and for maintaining said radial bore of said stub shaft in a radially outward orientation relative to said carrier axis.

2. The planetary gear carrier assembly of claim 1 wherein said anti-friction bearing is a caged needle bearing assembly.

3. The planetary gear carrier assembly of claim 1 wherein said means for engaging and maintaining is a circular plate having an inside edge engaging said flat and a snap ring for securing said circular plate to said carrier.

4. The planetary gear carrier assembly of claim 1 wherein said means for engaging and maintaining is an L-shaped ring having an outside edge engaging said flat and a snap ring for securing said L-shaped ring to said carrier.

5. The planetary gear carrier assembly of claim 1 wherein said means for engaging and maintaining is an L-shaped ring having an outside edge engaging said flat and a plurality of fasteners for securing said L-shaped ring to said carrier.

6. The planetary gear carrier assembly of claim 5 wherein said fasteners are machine screws.

7. The planetary gear carrier assembly of claim 1 wherein said means for engaging and maintaining is a circular plate having an inside edge engaging said flat and a plurality of fasteners for securing said circular plate to said carrier.

8. A planetary gear carrier assembly comprising, in combination,
   a planetary gear carrier defining an axis and having a plurality of pairs of aligned, spaced-apart bores parallel to said axis, a planet gear receiving opening between a pair of spaced-apart bores,
   a planet gear disposed in said planet gear receiving region,
   an anti-friction bearing disposed in said planet gear,
   a stub shaft disposed within said anti-friction bearing and extending between one of said pairs of aligned bores, said stub shaft including a planar end and a non-planar end located opposite said planar end, an axial bore opening at said planar end communicating with a radial bore, and a flat at said non-planar end, said radial bore oriented perpendicularly to said flat, and
   means on said carrier for engaging said flat of said stub shaft and maintaining said radial bore of said stub shaft in a radially outward orientation relative to said carrier axis.

9. The planetary gear carrier assembly of claim 8 wherein said anti-friction bearing is a caged needle bearing assembly.

10. The planetary gear carrier assembly of claim 8 wherein said means for engaging is a circular plate having an inside edge engaging said flat and a snap ring for securing said circular plate to said carrier.

11. The planetary gear carrier assembly of claim 8 wherein said means for engaging is an L-shaped ring having an outside edge engaging said flat and a snap ring for securing said L-shaped ring to said carrier.

12. The planetary gear carrier assembly of claim 8 wherein said means for engaging is an L-shaped ring having an outside edge engaging said flat and a plurality of fasteners for securing said L-shaped ring to said carrier.

13. The planetary gear carrier assembly of claim 12 wherein said fasteners are machine screws.

14. The planetary gear carrier assembly of claim 8 wherein said means for engaging is a circular plate having an inside edge engaging said flat and a plurality of fasteners for securing said circular plate to said carrier.

15. A planetary gear assembly comprising, in combination,
a sun gear defining an axis, a ring gear disposed on said axis and a planet gear carrier disposed on said axis and having a plurality of planet gears engaging said sun gear and said ring gear,
said planet gear carrier having a plurality of pairs of aligned, spaced-apart bores parallel to said axis, one of said plurality of planet gears disposed between each of said pairs of spaced-apart bores,
a stub shaft extending between each of said pairs of aligned bores and supporting one of said plurality of planet gears, said stub shaft including a planar end and a non-planar end disposed axially opposite the planar end, an axial bore opening at said planar end communicating with a radial bore and a flat disposed in said non-planar end, said radial bore oriented perpendicularly to said flat, and
means on said planet gear carrier for engaging said flat of said stub shaft to maintain said radial bore of said stub shaft in a radially outward orientation relative to said carrier axis.

16. The planetary gear assembly of claim 15 further including anti-friction bearings disposed between said planet gears and said stub shafts.

17. The planetary gear assembly of claim 15 wherein said means on said planet gear carrier is a circular plate having an inside edge engaging said flat and a snap ring for securing said circular plate to said carrier.

18. The planetary gear carrier assembly of claim 15 wherein said means on said planet gear carrier is an L-shaped ring having an outside edge engaging said flat and a snap ring for securing said L-shaped ring to said carrier.

19. The planetary gear carrier assembly of claim 15 wherein said means on said planet gear carrier is an L-shaped ring having an outside edge engaging said flat and a plurality of fasteners for securing said L-shaped ring to said carrier.

20. The planetary gear carrier assembly of claim 19 wherein said fasteners are machine screws.

* * * * *